UNITED STATES PATENT OFFICE 2,649,464

PHOSPHORUS-CONTAINING ORGANIC COMPOUNDS

Gilbert Spencer Hartley, Fulbourn, and Denis William Pound, Harston, England, assignors to Pest Control Limited, Bourn, England, a British company No Drawing. Application August 21, 1951, Serial No. 242,995. In Great Britain September 7, 1950

6 Claims. (Cl. 260—349)

This invention relates to new phosphorus-containing organic compounds and processes for their manufacture.

It is an object of this invention to provide certain novel phosphorus-containing organic compounds and processes for their manufacture.

It is a further object of this invention to provide certain novel phosphorus-containing organic compounds which are particularly useful as systemic insecticides.

The new compounds of the present invention are phosphorus-containing organic compounds containing less than eleven carbon atoms in the molecule of the general formula:

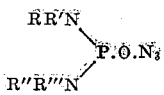

where R and R" are the same or different and are each a hydrogen atom or an alkyl group containing less than five carbon atoms and R' and R''' are the same or different and are each an alkyl group containing less than five carbon atoms.

These new compounds are phosphoryl azides and it is somewhat surprising that such compounds can be formed or at any rate are sufficiently stable for practical use.

A representative compound of the present invention is bis-dimethylamino-azido-phosphine oxide [(CH₃)₂N]₂PO.N₃. This compound is very stable in neutral aqueous solution and behaves as a systemic insecticide. Furthermore, with regard to acid and alkaline hydrolysis, the compound is more stable than the corresponding fluoride.

Another representative compound of the present invention is dimethylamino-mono-isopropyl-amino-azido-phosphine oxide, which is particularly effective as a systemic insecticide.

This azido compound is rather more stable in water both towards acids and alkalies than the corresponding fluoro compound. It has also rather more tendency to partition into organic solvents from water and can be salted out of aqueous solution as a substantially pure phase by means of sodium chloride. The substantially pure liquid, after drying in a vacuum desiccator over anhydrous calcium chloride, was not subjected to distillation but was maintained at 100° C. while small gunpowder charges were exploded above it so that incandescent particles were projected into the liquid. No ignition occurred. Further, a 50% solution in benzene was ignited on cotton wool in comparison with a similar treatment of pure benzene. The conflagration was no more violent in the case of the former solution. The liquid azido phosphine oxide is not therefore hazardously explosive.

The compounds of the present invention can be made in good yield from the corresponding chlorophosphine oxides by agitating with a concentrated aqueous solution of a water-soluble metal azide, preferably sodium azide or an aqueous or organic-aqueous solution of an azide of an organic base.

They may also be made by reacting the corresponding chlorophosphine oxides with hydrazine to form a compound of general formula (RR'N).(R"R'''N)PO.NH.NH₂ which is then reacted with nitrous acid in aqueous solution.

Thus, the present invention also includes a process for the manufacture of phosphorus-containing organic compounds containing less than eleven carbon atoms in the molecule of the general formula:

where R and R" are the same or different and are each a hydrogen atom or an alkyl group containing less than five carbon atoms and R' and R''' are the same or different and are each an alkyl group containing less than five carbon atoms, wherein a compound of the general formula:

is reacted with a concentrated aqueous solution of a water soluble metal azide, preferably sodium azide, or an aqueous or organic-aqueous solution of an azide of an organic base.

The present invention further includes a process for the manufacture of phosphorus-containing organic compounds containing less than eleven carbon atoms in the molecule of the general formula:

where R and R" are the same or different and are each a hydrogen atom or an alkyl group containing less than five carbon atoms, and R' and R''' are the same or different and are each an alkyl group containing less than five carbon atoms, wherein a compound of the general formula:

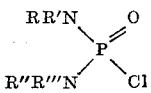

is reacted with hydrazine to form a compound of the general formula:

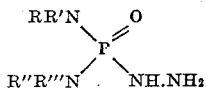

which is then reacted with nitrous acid in aqueous solution.

In carrying out the two above processes it is not necessary to start from the chlorine compound of the above-quoted general formula in its pure, isolated form. A start may equally well be made from a reaction mixture of an amine and phosphorus oxychloride containing the said chlorine compound, and this reaction mixture may be treated with the azide solution or with the hydrazine.

*Example 1*

Bis - dimethylamino - chloro - phosphine oxide was prepared by the addition of four molecular proportions of dimethylamine dissolved in carbon tetrachloride to one molecular proportion of phosphorus oxychloride in carbon tetrachloride. Dimethylamine hydrochloride was filtered off and the desired compound purified by fractional distillation of the filtrate.

10 gms. of this product was added, with agitation and cooling, to 5 gms. of sodium azide dissolved in 25 ccs. of water during a period of 30 minutes. The mixture was stirred at 15° C. for one hour and then extracted with two successive portions of 25 ccs. of chloroform to obtain the desired product free from sodium chloride and organic electrolytes derived from side reactions. To the combined chloroform extracts 50 ccs. of water were added and the mixture distilled under a pressure of 20 mms. mercury to remove the chloroform, leaving a clear aqueous solution of volume 41 ccs.

The resulting solution gave only a trace of amine on distillation with alkali and only a very slight precipitate with silver nitrate. After refluxing an aliquot in N hydrochloric acid for 30 minutes and then distilling from excess alkali, the distillate contained amine estimated by titration with hydrochloric acid to be equivalent to 1.47 gm. equivalents per litre of the original solution. No more amine was produced from a second aliquot which was refluxed with hydrochloric acid for 60 minutes, hydrolysis to amine being thus shown to be complete.

An aliquot was refluxed with N sodium hydroxide for 30 minutes and azide ions determined, in comparison with standards, by colorimetric estimation of the compound of azide and ferric ion in solution. Combined azide was thus found to be equivalent to 0.72 gm. equivalent per litre of original solution. A longer period of alkaline hydrolysis did not increase the yield of azide ion.

Phosphoric acid was determined by destructive hydrolysis and oxidation of an aliquot of solution containing less than 5 mgm. of the product in order to avoid explosion hazards by refluxing with 60% perchloric acid, after which excess perchloric acid was evaporated off and residual phosphoric acid determined colorimetrically by the molybdenum blue method (cf. Allen, Biochem. Journ. (1940), 850). Phosphoric acid corresponded to 0.73 gm.-mols. per litre of original solution.

These concentrations are in the ratio of 2:1:1 within experimental error and substantiate the constitution expected for the product. The concentration corresponds to a yield of 45% in the reaction between the bis(dimethylamino) chlorophosphine oxide and aqueous sodium azide.

A specimen of the aqueous solution made from phosphorus oxychloride containing radio-active phosphorus was found to give a partition ratio between chloroform and water of approximately 35:1 in favour of chloroform at 25° C. The radioactivity was still almost entirely transferred to the chloroform layer when the aqueous solution was again shaken with chloroform after standing for three weeks. No evolution of nitrogen was detected. The solution is, therefore, one of the substantially pure compound which is stable at ordinary temperature.

Aqueous solution diluted to 0.1% was sprayed on chrysanthemums and allowed to dry. Untreated chrysanthemum leaves bearing live specimens of the aphids *macrosiphoniella* and *coloradoa* were held adjacent to leaves of the treated plant. Those aphids which transferred themselves died after a few hours while those which remained on the untreated leaves survived. In another experiment, a 0.1% solution was applied to the roots of potatoes infested with the aphis *myzus persicae* and after a period from 12 to 72 hours according to situation the aphids were killed, showing that the insecticidal compound is translocated by the plant.

*Example 2*

To 76.5 gms. of phosphorus oxychloride in 300 ccs. of trichlorethylene was added with agitation and cooling 118 gms. of isopropylamine, the reaction temperature being kept at 20°±2° C.

35 gms. of sodium azide dissolved in 70 ccs. of water was added, and agitation and cooling continued for one hour. The solvent was removed by distillation at 10 mms. and 40–60° C. petroleum ether added to the residue. The crystalline product was filtered off.

Analysis of an aqueous solution of the crystalline product was carried out as in Example 1 by hydrolysis in acid followed by distillation of amine from alkali, by hydrolysis in alkali and colorimetric estimation of azide ion and by colorimetric estimation of phosphoric acid after destruction of a small sample with perchloric acid. This indicated that the product was substantially pure bis(mono-isopropylamino)-azidophosphine oxide.

Found: isopropylamine 58.2%, azide 19.8%, phosphoric acid 47.6%. Theory: 57.5, 20.5 and 47.8% respectively.

Biological tests similar to those described above with a solution of this material indicated that it also had power to kill aphids after absorption into plants.

*Example 3*

To 81 gms. of pure dimethylamino dichlorophosphine oxide dissolved in 300 ccs. of carbon tetrachloride, 60 gms. of isopropylamine were added with agitation at 30–40° C. The product was washed with 50 ccs. of water and the organic layer separated and fractionally distilled. The dimethylamino-isopropylamino chlorophosphine oxide had a boiling point of 118° C. at about 1.5 mm. of mercury, and a melting point of about 30° C. 21 gms. of sodium azide and 6.5 gms. of sodium bicarbonate were agitated with 50 ccs. of water and 50 gms. of the chloride added during 50 minutes. The temperature was raised to 40° C. and maintained there for 40 minutes. The top organic layer was separated and washed once with a small volume of brine.

The product was dried by standing in a vacuum desiccator containing calcium chloride.

5 gms. of the product were made up to 100 ccs. with water. The resulting solution gave only a trace of amine on distillation with alkali and only a very slight precipitate with silver nitrate. After refluxing 20 ccs. in N hydrochloric acid for 30 minutes and then distilling from excess alkali, the distillate contained amine which estimated by titration with N hydrochloric acid, required 10.3 ccs. for neutralisation, amounting to 0.52 equivalents per litre of the original solution. No more amine was produced from a second aliquot which was refluxed with hydrochloric acid for 60 minutes, hydrolysis to amine being thus shown to be complete.

20 ccs. of the above solution was refluxed with N sodium hydroxide for 30 minutes and azide ion determined, in comparison with standards, by colorimetric estimation of the compound of azide and ferric ion in solution. Combined azide was thus found to be equivalent to 0.26 gm. equivalent per litre of original solution. A longer period of alkaline hydrolysis did not increase the yield of azide ion.

Phosphoric acid was determined by destructive hydrolysis and oxidation of 0.2 ccs. of the above solution (containing only 10 mg. of the product in order to avoid explosion hazards) by refluxing with 60% perchloric acid, after which excess perchloric acid was evaporated off and residual phosphoric acid determined colorimetrically by the molybdenum blue method (cf. Allen, Biochem. Journ. (1940), 850). The phosphoric acid corresponded to 0.26 gm.-mol. per litre of original solution.

An aqueous solution of the compound diluted to 0.005% when sprayed directly on chrysanthemum leaves bearing live aphids killed all the aphids within 24 hours. When a 0.05% solution was used the aphids were all dead in one hour. An aqueous solution diluted to 0.05% was sprayed in chrysanthemums and allowed to dry. Untreated chrysanthemum leaves bearing live specimens of the aphids *Macrosiphoniella sanborni* and *Coloradoa rufomaculata* were held adjacent to leaves of the treated plant. Those aphids which transferred themselves died after a few hours while those which remained on the untreated leaves survived. In another experiment, a 0.1% solution was applied to the roots of potatoes infested with the aphis *myzus persicae* and after a period from 12 to 72 hours according to situation the aphids were killed, showing that the insecticidal compound is translocated by the plant.

What we claim is:

1. New phosphorus-containing organic compounds containing less than eleven carbon atoms in the molecule of the general formula:

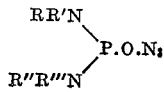

where R is selected from the group consisting of alkyl groups containing less than five carbon atoms and hydrogen, R' is an alkyl group containing less than five carbon atoms, R'' is selected from the group consisting of alkyl groups containing less than five carbon atoms and hydrogen and R''' is an alkyl group containing less than five carbon atoms.

2. Bis-dimethylamino-azido-phosphine oxide.
3. Bis(mono-isopropylamino)-azido-phosphine oxide.
4. Dimethylamino-mono-isopropylamino-azido-phosphine oxide.
5. A process for the manufacture of phosphorus-containing organic compounds containing less than eleven carbon atoms in the molecule of the general formula:

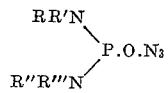

where R is selected from the group consisting of alkyl groups containing less than five carbon atoms and hydrogen, R' is an alkyl group containing less than five carbon atoms, R'' is selected from the group consisting of alkyl groups containing less than five carbon atoms and hydrogen and R''' is an alkyl group containing less than five carbon atoms, which comprises reacting a compound of the general formula:

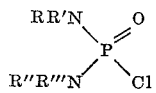

with a concentrated aqueous solution of a water-soluble metal azide.

6. A process for the manufacture of phosphorus-containing organic compounds containing less than eleven carbon atoms in the molecule of the general formula:

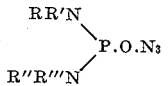

where R is selected from the group consisting of alkyl groups containing less than five carbon atoms and hydrogen, R' is an alkyl group containing less than five carbon atoms, R'' is selected from the group consisting of alkyl groups containing less than five carbon atoms and hydrogen and R''' is an alkyl group containing less than five carbon atoms, which comprises reacting a compound of the general formula:

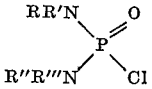

with a concentrated aqueous solution of sodium azide.

GILBERT SPENCER HARTLEY.
DENIS WILLIAM POUND.

References Cited in the file of this patent

Sidgewick: "Organic Chemistry of Nitrogen" (1937), pp. 374 to 375.